Figure 1:
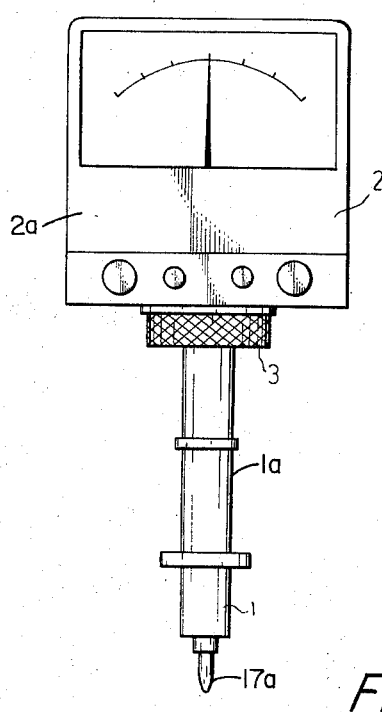

United States Patent [19]

Ito

[11] 3,768,169

[45] Oct. 30, 1973

[54] MINITYPE ELECTRONIC MICROMETER

[75] Inventor: Yasutaka Ito, Tokyo, Japan

[73] Assignee: Tokyo Seimitsu Co. Ltd., Tokyo, Japan

[22] Filed: Sept. 8, 1970

[21] Appl. No.: 70,291

[30] Foreign Application Priority Data
Oct. 14, 1969 Japan.............................. 44/97223

[52] U.S. Cl.............................................. 33/172 E
[51] Int. Cl........ G01b 3/22, G01b 5/00, G03b 1/64
[58] Field of Search ..................... 33/172 R, 172 E; 339/89 C

[56] References Cited
UNITED STATES PATENTS

| | | | |
|---|---|---|---|
| 3,482,323 | 12/1969 | Hamel et al. ...................... | 33/172 A |
| 3,149,421 | 9/1964 | O'Brien............................. | 33/172 E |
| 2,885,660 | 5/1959 | Hecox .............................. | 33/172 E |
| 3,058,225 | 10/1962 | Ward................................. | 33/172 E |

*Primary Examiner*—Harry N. Haroian
*Attorney*—Robert E. Burns and Emmanuel J. Lobato

[57] ABSTRACT

A minitype electronic micrometer comprises a detecting unit releasably connected mechanically and electrically to an amplifier-indicator unit to form a single unitary instrument similar in configuration to a dial gauge. The amplifier-indicator unit comprises an oscillator, phase detector, A.C. amplifier, D.C. amplifier and meter housed in a casing provided with means for attachment of the detecting unit comprising a differential transformer housed in a tubular casing and having a movable core with a work-engaging portion. A coupling mechanically connects the tubular casing of the detecting unit rigidly to the casing of the amplifier-indicator unit and at the same time connects the differential transformer of the detecting unit electrically to the oscillator and the A.C. amplifier of the amplifier-dectector unit.

5 Claims, 5 Drawing Figures

MINITYPE ELECTRONIC MICROMETER

The present invention relates to a minitype electronic micrometer the detecting part of which can be directly connected to the amplifier-indicator part and utilized as one body.

The conventional electronic micrometer is composed of a detecting part (which contacts a measuring portion) comprising a differential transformer, an amplifier part which amplifies the electrical signal obtained in the detecting part and an indicator part which indicates the value on an indicator (that is an indicating meter). The amplifier part and the indicator part are usually connected in one body. However, the detecting part is connected to the amplifier-indicator part by a connecting cable. That is, the detecting part could not be directly connected to the amplifier and the indicator part. In some cases, it is very unfavorable that the detector part is separate from the amplifier-indicator part, because it is desirable that the whole apparatus, the detecting part, the amplifier-indicator part are included in one body as in the case of a dial gauge.

An object of the present invention is to provide a minitype electronic micrometer wherein the detecting part thereof is directly connected to its amplifier-indicator part as one body.

Another object of the present invention is to provide an electronic micrometer wherein the detecting part thereof can be separated from its amplifier-detector part, if necessary.

A further object of the present invention is to provide an electronic micrometer having high performance and high precision.

Figure 2:
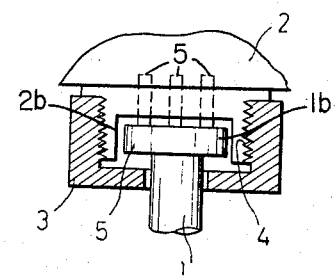
Figure 3:
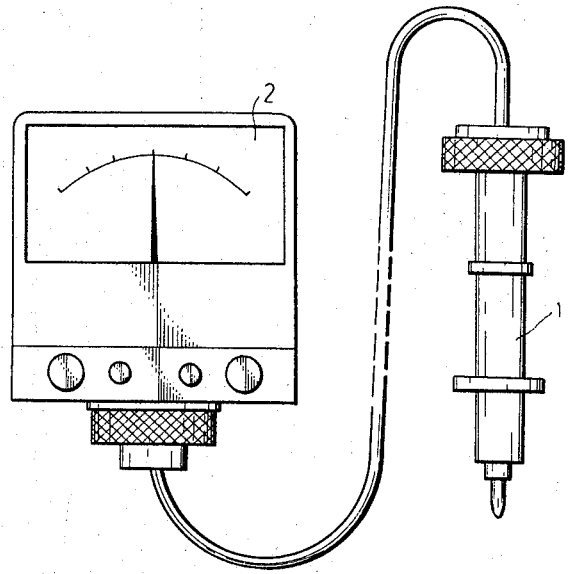
Figure 4:
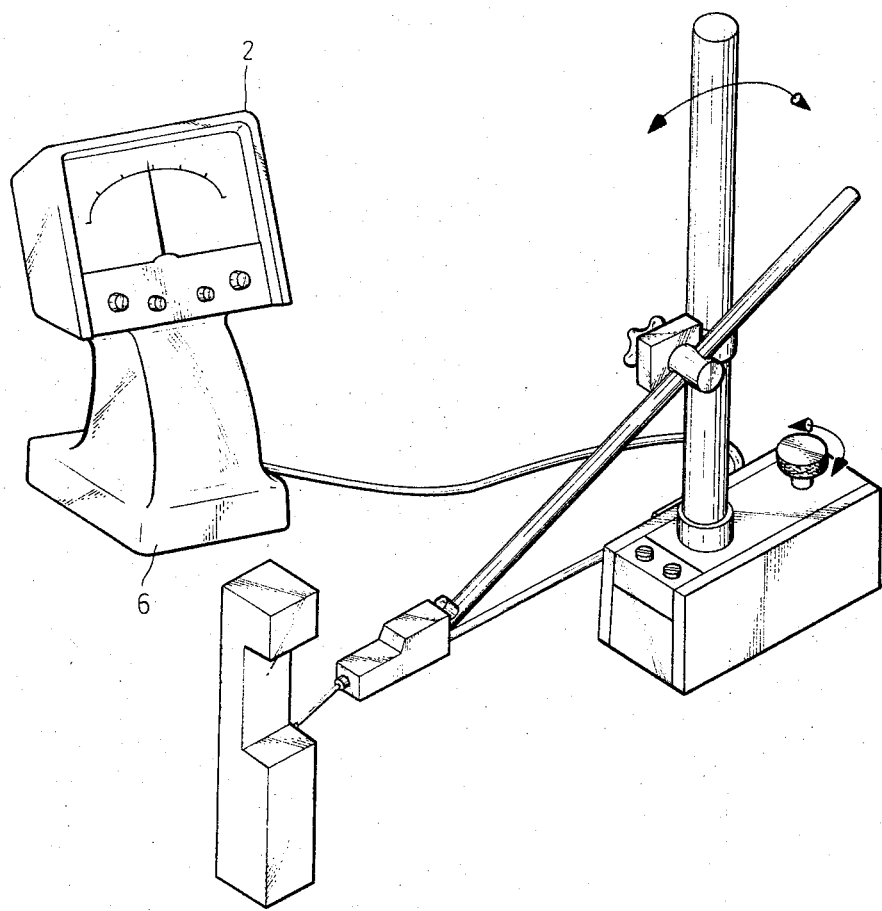
Figure 5:
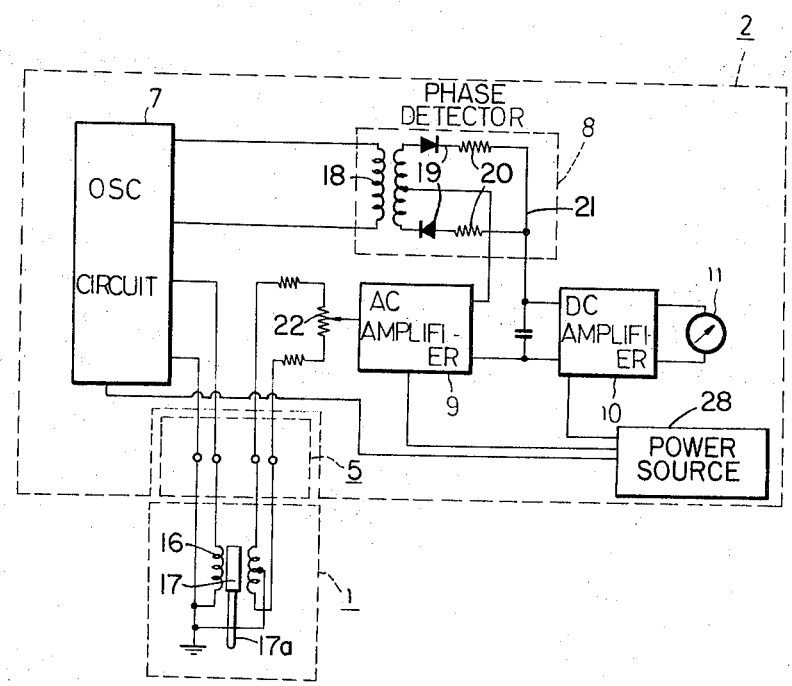

Other objects and features of the invention will be more fully explained through the following description and the accompanying drawings in which:

FIG. 1 shows a front view of the one body type electronic micrometer of the present invention, FIG. 2 shows a sectional view of the connecting part of the one body type electronic micrometer, FIG. 3 shows a front view of the electronic micrometer of the present invention in the case where the detecting part and the amplifier-indicator part are separated from each other, FIG. 4 is an example of the utilization of the amplifier-indicator part with another kind of detector, and FIG. 5 is a circuit diagram of the electronic micrometer of the present invention.

Referring to FIG. 1, a detecting part 1 and an amplifier-indicator part 2 are connected mechanically to each other by a connecting part 3 and the connecting part 3 is provided with electrical contacts 5 (shown in FIG. 2) so as to connect the above-mentioned two parts electrically as shown in FIG. 2. Further, referring to FIG. 2, the detecting part 1 and the amplifier-indicator part 2 can be separated by releasing a screw part 4 through the connector 5 to the primary winding of the differential transformer 16 thereby the electrical connector 5 provided in the connecting part 3 can be separated. Then, the electronic micrometer of the present invention can be used in the separated state of the detecting part 1 and the amplifier-detector part 2 by connecting these two parts by an electric cable 15 as shown in FIG. 3. As mentioned above, in the electronic micrometer of the present invention, the amplifier-indicator part can be placed in a position near the measuring point, further, if necessary, the indicator part can be separated and positioned away from the measuring point. As a result of this, the measuring efficiency can be considerably improved.

The indicator used in the conventional electric micrometer requires considerable time for the indicating needle of the indicating meter to settle and is not suitable for continuous measurement. This is because the indicator is a voltmeter, and the current passing through it is very small. In contrast, the indicator used in the present invention is an ammeter and the indicating needle can be provided with sufficient damping force by means of a spring so that the response of the indicator is considerably improved. It is hence usable for continuous measurement.

As mentioned above, in the electronic micrometer of the present invention, the following advantages are provided over the conventional electric micrometer:

a. The micrometer can be designed to be very small and compact and the amplifier-indicator part connected to the detecting part can be mounted on a stand arm directly, b. The cable for connecting a detecting part to the amplifier-indicator part is not necessary.

c. The amplifier-indicator part are simply separable from the detecting part and can be used with other kinds of detectors, and thus is suitable for a wide range of application. Referring to FIG. 4, the amplifier-indicator part 2 is mounted on the supporting base 6 and can be used with other kinds of detectors.

d. The handling and the operation is very simple.

FIG. 5 shows a block circuit diagram of the micrometer of the present invention. Referring to FIG. 5, the detecting part 1 is composed of a differential transformer having a primary winding, a secondary winding with a center tap connected to ground and a movable core 17 having a work-engaging tip 17a. The four terminals of the transformer 17 are electrically connected, for example by using a 4 pole connector 5 to the amplifier-indicator part 2 which is constituted as an integrated circuit. The amplifier-indicator part 2 is composed of an oscillator circuit 7, a synchronizing detector circuit 8, an AC amplifier 9, a DC amplifier 10 and an indicating meter 11. The phase detector 8 comprises a transformer 18 having a primary winding and a secondary winding with a center tap and two end terminals connected through diodes 19 and resistances 20 to an output line 21. The output of the oscillator circuit 7 is applied through the connector 5 to the primary winding of the differential transformer 16 of the detecting part 1 and also directly to the primary winding of the transformer 18 of the synchronizing detector circuit 8. The output of the secondary winding of the differential transformer of the detecting part 1 is applied through a potentiometer 22 and the AC amplifier 9 between the center tap of the secondary winding of the transformer 18 of the synchronizing detector circuit 8 and ground. The phase detector circuit 8 detects the output of the differential transformer 16 of the detecting part 1 amplified by the AC amplifier 9 in comparison with the output of the oscillator circuit 7 and produces a DC output corresponding to the position of the core 17 of the differential transformer 16. The DC output of the detecting circuit 8 is indicated by the indicating meter 11 via the DC amplifier 10. Power source 20 supplies the necessary voltage for the oscillator circuit 7, AC amplifier 9 and DC amplifier 10.

As seen in FIGS. 1 and 2, the detecting unit 1 comprises a tubular casing 1a which houses the differential transformer. The work-engaging tip 17a of the movable transformer core projects from one end of the tubular casing to engage the piece fo be measured. At the opposite end the casing 1a is provided with an annular flange 1b. Four contacts 5 of the differential transformer are provided at the flanged end of the tubular housing. The amplifier-detector unit 2 comprises a casing 2a which houses the meter 11 having a scale and points visible through a window of the casing and the integrated circuitry 7-10 described above. The casing 11a has an externally threaded projecting part 2b having a recess to receive the flanged end of the tubular casing 1a. The connecting part 3 comprises a collar which is rotatable on the flanged end of the tubular casing 1a and screws onto the threaded part 2b to mechanically connect the tubular casing 1a to the casing 2a. The circuitry in the casing 2 a is provided with four contacts which are engaged by the contacts of the detecting unit 1 so as electrically to connect the differential transformer of the detecting unit 1 with the circuitry of the amplifier-indicator unit 2 when the collar 3 is screwed on the threaded part 2b. The detecting unit 1 and amplifier-indicator unit 2 are thereby releasably united into a single unitary instrument.

As mentioned above, the electronic micrometer of the present invention can be assembled into a compact form, because an integrated circuit can be used in the electric circuit of the amplifier-indicator part. Characteristics and reliability of the electronic micrometer are excellent and its maintenance can be effected in a simple manner. Further, the amplifier-indicator part is connected to the detecting part in one body and measurements can be carried out at the measuring position in a manner similar to a dial gauge and the handling and operation of the instrument are very simple. According to the embodiment of the present invention, the dimensions of the detecting part are about 28 mm $\phi$ x 150 mm, and its weight, about 700 g; the dimensions of the amplifier-indicator part are about 140 mm (width) × 100 mm (depth) × 100 mm (height), and its weight, about 1,500 g; the AC source is used as the power source of the electric micrometer and its value is about 1 volt-ampere.

While the invention has been described in conjunction with certain embodiments thereof it is to be understood that various modifications and changes may be mqde without departing from the spirit and scope of the invention.

What is claimed is:

1. A minitype electronic micrometer comprising an amplifier-indicator unit comprising a casing, integrated circuitry having an input and an output, an indicating meter in said casing and electrically connected to the output of said amplifying circuitry; a detecting unit comprising a tubular casing, a contacting part which contacts a piece to be measured and detecting means in said tubular casing for providing an electrical signal corresponding to the displacement of said contacting part with respect to said tubular casing, and means for detachably coupling said detecting unit directly to said amplifier-indicator unit comprising means for mechanically securing said tubular casing of said detecting unit rigidly to the casing of said amplifier-indicator unit and means for electrically connecting said detecting means with said integrated circuitry to separably unite said detecting unit and said amplifier-indicator unit into a single unitary electronic micrometer, wherein said coupling means comprises a flange at one end of said tubular casing, an externally threaded part on the casing of said amplifier-indicator unit having a recess to receive the flanged end of said tubular casing and an internally threaded collar rotatable on said flanged end of said tubular casing and screwing onto said threaded part of said casing of the amplifier-indicator unit, wherein said coupling means comprises electrical contacts in said recess of said externally threaded part to the casing of the amplifier-indicator unit and electrical contacts at said flanged end of said detecting unit which engage said first mentioned contacts which said collar is screwed onto said threaded part.

2. A minitype electronic micrometer according to claim 1, wherein said detecting means comprises a differential transformer having a primary and a secondary winding and said contacting part comprises a movable core of said transformer.

3. A minitype electronic micrometer according to claim 2, wherein said integrated circuitry comprises a phase detector circuit having two inputs and an output, an oscillator circuit having an output connected to a first input of said detector circuit and through said coupling means to the primary of said differential transformer, an AC amplifier having an input connected through said detecting means to the secondary of said differential transformer and an output connected to a second input of said detector circuit and a DC amplifier having an input connected to the output of said detector circuit and an output connected to said indicating meter.

4. A minitype electronic micrometer according to claim 3, wherein said phase detector circuit comprises a transformer having a primary connected to said oscillator circuit output and a secondary having a center tap connected to the output of said AC amplifier.

5. A minitype electronic micrometer according to claim 4, wherein said phase detector circuit further comprises diodes and resistances connected between opposite end terminals of the secondary windings of said transformer of said detector circuit and a common output connected to the input of said DC amplifier.

* * * * *